Nov. 10, 1964 J. F. BROCK 3,156,472

MAGNETIC TONE ARM SUSPENSION

Filed Feb. 27, 1963

INVENTOR.
JOE F. BROCK

BY
Emery, Booth, Miller & Townsend

ATTORNEYS

United States Patent Office 3,156,472

Patented Nov. 10, 1964

3,156,472

MAGNETIC TONE ARM SUSPENSION

Joe F. Brock, Rome, N.Y.
(6016 Fernview Ave., Cincinnati, Ohio)

Filed Feb. 27, 1963, Ser. No. 261,329
10 Claims. (Cl. 274—23)

This invention relates to tone arm suspension.

A tone arm is used in manual and automatic disc record-players to maintain the stylus in a point down condition on the record while that is spinning during play, and it comprises usually an elongated laterally extending member fitted at one end with the stylus and associated pickup and suspended at its other end from, and for vertical and lateral swinging movements with respect to, a support located alongside the record. This construction enables the unsupported end of the arm to be swung over to position the stylus on the spinning record, and the arm itself is free to move toward the center of the record as the laterally vibrating stylus follows the inwardly spirally V-shaped record groove.

While prior tone arm suspensions performed satisfactorily up to a point, they caused distortion of the sounds reproduced from the records and caused also progressive permanent damage to the records themselves as well as to the needles or styli because they relied on various types of mechanical hinges and pivots to link the ends of the tone arms on to their supports. The friction forces inherent in such linkage opposed the tracking movement of the stylus toward the center of the record as the stylus travelled along the spiral recording groove. Hence the stylus was pressed or biased with a considerable constantly changing force against the outside wall of the groove. While a certain amount of this side pressure or bias toward the outside of the record, caused as aforesaid by pivot-bearing friction, is desirable to offset the side pressure or bias toward the inside of the record present in substantially all record-players by reason of a torque developed in the tone arm as a result of friction between the stylus and the record, usually the outward pressure far exceeded the amount required to overcome said inward pressure particularly when the tone arm was positioned near the outside of the record.

Prior tone arm suspensions were disadvantaged also because they required fairly frequent and time-consuming maintenance including lubrication and adjustment to keep the tone arm tracking properly across the record. Further, they did not permit easy access to the stylus and pickup for repair and replacement purposes.

Accordingly, this invention aims to provide a tone arm suspension which has very little pivot-bearing friction to oppose the tracking of the stylus and to press it against the outside wall of the record groove, and which permits the ready removal of the tone arm from the record player to facilitate maintenance of the stylus and pickup, or safe storage of the tone arm itself. This invention seeks also to provide a tone arm suspension which is easily and economically manufactured, yet is rugged, and one which requires no lubrication or other expensive maintenance. Especially it is an object of this invention to provide a tone arm suspension which causes the tone arm and stylus to track automatically across the record, thereby greatly reducing record and needle wear caused by friction between the stylus and the walls of the record groove.

Figures 1, 3:
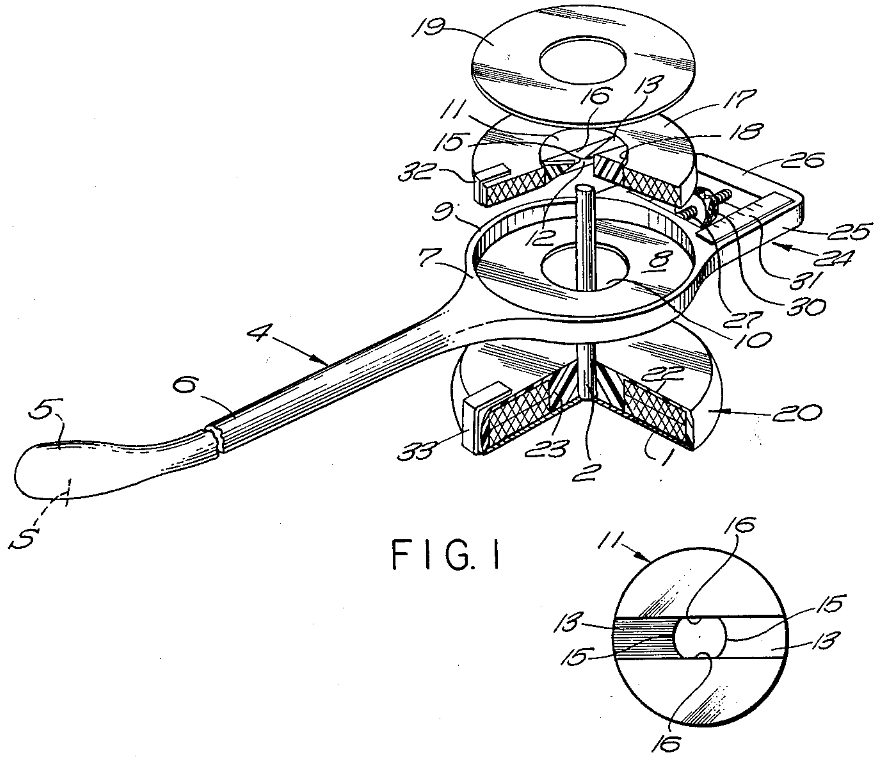
FIG. 1 is an exploded perspective view showing the elements of my improved tone arm suspension, with portions cut away.
FIG. 3 is an elevational view on a larger scale of a bearing member of the device of FIGS. 1 and 2.

Referring to the drawings in more detail, my improved tone arm suspension comprises a flat base 1 which may be a portion of the record-player base adjacent the turntable and on which is mounted a rigid generally cylindrical upstanding post 2. Post 2 extends up an appreciable distance, say three to five inches for an average size of apparatus, from base 1 and has its upper end 3 cut obliquely for reasons that will become apparent hereinafter.

A tone arm in accordance with the invention is indicated generally at 4 and is adapted for operative positioning above base 1. This tone arm 4 comprises in the illustrated embodiment a single casting having a head portion 5 containing the pick-up and stylus (indicated schematically at S), an elongated neck portion 6, and a body portion 7. For reasons that will become apparent, the body portion 7 is desirably dished having a generally circular bottom wall 8 whose diameter is approximately the same as that of base 1 and having also a vertical side wall 9 whose height is approximately the same as that of the neck portion 6. The bottom wall 8 of body portion 7 has formed therein a centrally located, preferably circular passage 10 whose diameter is appreciably larger than that of post 2 and whose center is seen to coincide with the swinging axis of the tone arm 4.

In accordance with the invention, tone arm 4 is adapted to be mounted for vertical sliding and vertical and lateral swinging movements with respect to the axis of post 2. Accordingly tone arm 4 is fitted with a locating or bearing member indicated generally at 11 operatively aligned with passage 10 in the tone arm body portion 7. This bearing member 11 is constructed most desirably of a relatively hard, self-lubricating or waxy dielectric material such for example as that sold by E. I. du Pont de Nemours Company under its trademark "Teflon." It is preferably discoid, corresponding in size and shape to passage 10 so that this bearing member 11 can be squeezed tightly within passage 10, or, as shown in the drawing, so that it can be secured adjacent to and thereby to cover the entirety of passage 10.

Figure 2:
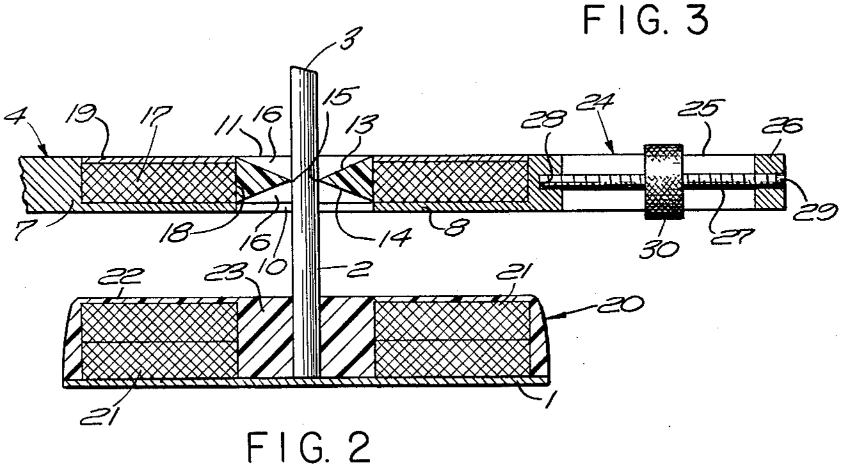
FIG. 2 is a medial cross-sectional view of a portion of the apparatus of FIG. 1 on a larger scale.

Referring to FIG. 3 as well as FIGS. 1 and 2, an axial or centering passage 12 is formed in bearing member 11 at the center thereof and coaxial with the center of passage 10, which passage 12 has a diameter only slightly larger than the diameter of and for receiving post 2 so that the bearing member and hence the tone arm 4 can be slid up and down and also be swung laterally with respect to post 2 as a locating axis. A pair of channels or grooves 13, 14 are formed in the top and bottom face respectively of bearing member 11 in the zone thereof coinciding with opposite wall portions of passage 12 and running parallel to a line drawn between head portion 5 of the tone arm and the axial passage 12, and which line may be referred to as the longitudinal axis of the tone arm. The channels 13, 14 accordingly extend substantially diametrically of the bearing member 11. Each is oppositely inclined from the respective outer ends of and toward the center of bearing member 11 so as to converge into acute formations or knife edges 15, 15 lying in a common and generally horizontal plane intermediate said top and bottom faces of the bearing member 11 and being oppositely concavely curved to form radially opposite portions of the boundary of the axial bearing passage 12. These acute knife edges 15, 15 comprise the entire bearing surface able to contact with post 2 except for the two small diametrically opposed vertical wall portions 16, 16 lying at the opposite sides of channels 13, 14, which wall portions 16 as apparent in FIG. 1 extend in parallel vertical planes that are perpendicular to the major chords subtending the curved knife edges 15, 15.

It is apparent from the foregoing that the partial knife-edge configuration of bearing 11 within and in conjunction with the channels 13, 14 thereof permits the tone arm 4 to swing or tilt with respect to post 2 in the vertical plane containing its head portion 5, but due to the flat wall portions 16, 16 prohibits its swinging or tilting in any other vertical plane. It is evident also that because of the sharp self-lubricating knife-edge bearing surfaces 15, 15 the tone arm 4 can move bodily up and down relative to the axis of post 2 and also swing laterally about said axis, subject to minimal frictional opposing force.

Further in accordance with this invention, means are provided for magnetically floating or suspending tone arm 4 at an elevated position on post 2 above base 1. In the illustrated embodiment such suspension comprises a first magnet means 17 mounted on tone arm 4. It may be an electromagnet, or when substantially interference-free sound pickup is desired, it may be a permanent magnet as illustrated. Said magnet means 17 is so constructed and arranged on tone arm 4 as to produce a strong magnetic field having a substantial number of flux lines extending vertically below body portion 7 and distributed symmetrically about the perimeter of the described passage 12 coinciding with the swinging axis of the tone arm 4. Magnet means 17 is constructed of a ferromagnetic material such as, for example, cast or sintered Alnico alloy, and is most desirably discoid or disc-shaped having a diameter slightly less than that of bottom wall 8 of the tone arm body 7 and a thickness somewhat less than the height of side wall 9 of said arm body so as to fit snugly within said dished body portion of tone arm 4. The magnet is formed with a central axial passage 18 corresponding with the passage 10 in tone arm 4 so that the magnet is able to fit snugly about bearing member 11 when the tone arm elements are fully assembled as shown in the drawing FIG. 2.

Figure 4:
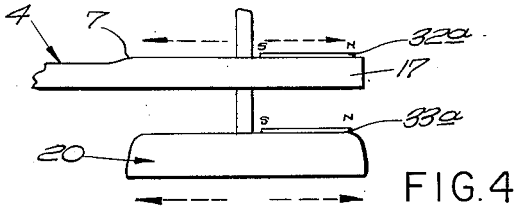
FIG. 4 is a partly diagrammatic view corresponding to FIG. 2, upon a smaller scale, illustrating a modification.

Magnet means 17 is desirably magnetized or polarized in the axial direction such that its top face is a north pole and its bottom face is a south pole, or vice versa. Alternatively, the direction of magnetization may be radial such that the inner circumference of the magnet means 17 is a north pole and the outer circumference a south pole, see FIG. 4, or vice versa. In any event magnet means 17 has a direction of magnetization such as to produce one or more magnetic poles adjacent its bottom face and distributed symmetrically about its vertical axis for causing the aforementioned vertical flux line distribution.

A disc-shaped cover member 19 constructed of a suitable dielectric material and having an opening to accommodate bearing member 11 is secured over magnet means 17 within the dished portion of tone arm 4 to enclose and protect the magnet.

The instant tone arm suspension comprises also a second magnet means indicated generally at 20 affixed to base below tone arm 4. This magnet means 20 is constructed and arranged to provide a strong magnetic field having opposite polarity from that of magnet means 17 and having a substantial number of flux lines extending above magnet means 20 and distributed symmetrically about post 2, the pivotal axis of tone arm 4. Magnet means 20 most conveniently comprises a single magnet 21 identical to magnet means 17 but of opposite polarity; but if additional repelling force is desired in the region between magnet means 17 and 20, it may comprise, as illustrated, a plurality of such magnets 21 arranged in parallel. A protective coating or covering 22 of resin or plastic is applied over magnet means 20, a portion 23 of which material may be used to fill up the central passages in magnets 21.

It will be appreciated from the foregoing that tone arm 4 can be mounted easily on post 2 by fitting the opposite knife edges 15, 15 successively over the obliquely cut post top 3. The tone arm will slide down post 2 until the proximity of the repelling fields of magnet means 17, 20 is such as to produce an upward force equal to the downward force caused by the weight of the tone arm. This occurs when the bottom of the tone arm 4 is still appreciably above the top of the lower magnet covering 22. When so arranged, the cooperating magnetic means 17, 20 are seen to produce strong constant upward forces all around the swinging axis of tone arm 4 and which are sufficient to float or suspend the tone arm at a constant elevation on post 2 above magnet means 20 even when the tone arm swings laterally with respect to post 2 as the stylus moves or tracks from the edge to the center of the record during play.

As mentioned previously, the channels 13, 14 formed in bearing member 11 permit the tone arm 4 to swing or tilt in the vertical plane containing its head portion 5. Actually the tone arm tends to tilt down under the weight of the head and neck portions 5, 6 respectively, thereby applying a substantial vertical pressure through the stylus to the record. Desirably for minimum needle and record wear, the stylus pressure should be kept quite small, on the order of 2–4 grams. Accordingly a weight-compensating means indicated generally at 24 is provided to control the stylus pressure. In the illustrated embodiment such means is adjustable and comprises a pair of rearwardly extending arms 25 mounted on opposite sides of the body portion 7 and connected together at their open ends by a cross member 26. An elongated threaded screw member 27 is secured at its opposite ends within openings 28, 29 provided in the rear side of wall 9 of the tone arm body portion 7 and in cross member 26 respectively. A correspondingly threaded relatively heavy knurled nut 30 is placed on screw member 27 before the latter is secured in place, to serve as an adjustable counterweight. The weight of nut 30 should be sufficient to balance the tone arm 4 so that it floats substantially horizontally above magnet means 20 when nut 30 is positioned intermediate the ends of screw member 27. A guide plate or index 31 is mounted on arm 25 for facilitating the balancing operation and to afford indication of given settings.

With the instant tone arm suspension, the lateral swinging of tone arm 4 is opposed by very small friction forces because essentially the only contact between the tone arm and its support or locating and guide post 2 is at the extremely sharp self-lubricating knife edges 15, 15. Practically no pressure is exerted by the stylus against the outside wall of the record groove as a result of pivot bearing friction. Under this invention, however, even the adverse effects of the small amount of pivot-bearing friction between knife edges 15, 15 and post 2 may be eliminated by applying a small torque force to tone arm 4 which causes the arm to tend to track or swing automatically across the record. More particularly, a pair of magnetic field modifying means 32, 33, FIG. 1, are mounted on magnet means 17, 20 respectively. These field modifying means 32, 33 comprise each a relatively narrow strip of metal having a fairly high magnetic permeability and extending between the poles of its corresponding magnet means. In the illustrated embodiment, they take the form of ferrous clips secured over the edges of the axially polarized magnet means 17, 20. Of course if radially polarized magnet means 17, 20 are employed, as in the modification of FIG. 4, the field modifying metal strip means *32a, 33a* would extend radially across the top or bottom faces between poles of their corresponding magnet means.

The field modifying clips 32, 33 are seen to cause concentrations of magnetic flux in the regions surrounding the two clips, thereby modifying the angular symmetry of the magnetic fields and creating in effect a pair of localized magnetic poles on opposite faces of and at a radius of each magnet means. The localized poles at the bottom of the upper clip 32 and at the top of the lower clip 33 being of like polarity tend to repel each other. Accordingly, when the clips 32, 33 are arranged so that when the stylus is placed at the beginning of the record, the clip 32 is very slightly displaced in the direction of travel of the tone arm from a position directly above clip 33, the repelling force produced by the localized poles has a lateral torque producing component which causes the tone arm 4 (and stylus) to swing or track automatically toward the center of the record. The strength and effective duration of this force may be controlled somewhat by adjusting the sizes of clips 32, 33 and gradually decreases as the two clips move farther apart. However this decrease in force is compensated for by the force caused as aforesaid by stylus friction which tends also to move the tone arm toward the center of the record. As mentioned previously this latter force is very small when the stylus is positioned near the outside of, but gradually increases as the stylus moves toward the center of the record so that it complements the force produced by clips 32, 33 over the tracking path of tone arm 4.

In other words, these complementary forces tending to encourage tone arm 4 tracking toward the center of the record substantially cancel the force due to pivot bearing friction tending to inhibit said tracking, over the entire tracking path of the tone arm. The net result is that the pressure of the stylus on the two walls of the V-shaped record groove remains substantially equal and is constant because it is caused solely by the vertically applied effective weight of the tone arm as determined by the adjustment of counterweight 30.

It will be appreciated that the tone arm 4 can be separated easily from the rest of the record-player for purposes of stylus or pickup repair or for transportation or storage of the arm itself simply by disconnecting any electrical leads and lifting the arm off post 2. Once the proper setting of counterweight 30 is found for a particular pickup, the index 31 may be marked or the setting thereof noted opposite a scale as indicated, to facilitate tone arm balancing. It will be appreciated from the foregoing also that may improved tone arm suspension may be used on automatic as well as manual, monaural or stereo record-players; that it is rugged but inexpensive to manufacture; that it requires substantially no maintenance and more importantly that it prolongs the useful life of phonograph records and styli.

My invention is not limited to the particular embodiments thereof illustrated and described herein, and I set forth its scope in my following claims.

I claim:

1. In a record-player having a turntable: an upstanding post fixed adjacent the turntable; an elongated tone arm extending laterally from the post, bearing means mounted at the end of said tone arm and having a vertical passage therethrough for removably receiving said post whereby said tone arm is adapted to slide vertically and to swing laterally with respect to the axis of the post; first magnet means mounted on and for movement with said tone arm end portion; and second magnet means mounted below said first magnet means, said first and second magnet means having opposite directions of magnetization for producing opposing magnetic fields, the repelling force of said opposing magnetic fields being such as to produce an upward force equal to the down force caused by the weight of the tone arm, and the bottom of the tone arm being thereby floated at an elevation appreciably above the top of the lower magnet means.

2. In a record-player having a turntable: an upstanding post fixed adjacent the turntable; an elongated tone arm extending laterally from the post, bearing means mounted at the end of said tone arm and having a vertical passage therethrough for removably receiving said post whereby said tone arm is adapted to slide vertically and to swing laterally with respect to the axis of the post; first magnet means mounted on and for movement with said tone arm; second magnet means mounted below said tone arm, said first and second magnet means having opposing magnetic fields, the repelling force of said opposing magnetic fields being such as to produce an upward force equal to the down force caused by the weight of the tone arm, and the bottom of the tone arm being thereby floated at an elevation appreciably above the top of the lower magnet means; first magnetic field modifying means mounted on said first magnet means for producing at an angular location thereon a region of increased flux density; and second magnetic field modifying means mounted on said second magnet means at an angular location thereon for producing a region of increased flux density whereby a magnetic torque is imposed on said tone arm urging it to swing laterally about said axis when said first and second field modifying means are approximately vertically aligned.

3. A tone arm suspension comprising: an upstanding post; an elongated tone arm extending generally laterally from said post, bearing means mounted at the end of said tone arm and having a vertical passage therethrough for removably receiving said post whereby said tone arm is adapted to slide vertically and to swing laterally with respect to the axis of the post; a first discoid magnet affixed to said tone arm end portion coaxially with said post; and a second discoid magnet mounted below said first magnet coaxially with said post, said first and second magnets having opposing magnetic fields, the repelling force of said opposing magnetic fields being such as to produce an upward force equal to the down force caused by the weight of the tone arm, and the bottom of the tone arm being thereby floated at an elevation appreciably above the top of the lower magnet; and first and second magnetic field modifying means mounted respectively on said first and second discoid magnets for imposing a magnetic torque on the tone arm about the axis of said post when the magnets are in approximate vertical alignment.

4. A tone arm suspension according to claim 3 wherein the directions of magnetization are axial along the first and second magnets and the magnetic field modifying means comprises relatively narrow ferrous metal clips engaging the outer edges of the first and the second magnets respectively.

5. A tone arm suspension according to claim 3 wherein the directions of magnetization are radial and the magnetic field modifying means comprises for each of the first and the second magnets a relatively narrow ferrous metal strip extending along radii thereof respectively.

6. A tone arm suspension as defined in claim 3 including in combination an adjustable counterweight mounted on said one end portion of said tone arm for maintaining said tone arm in a substantially horizontal condition when it is floated above said second magnet.

7. A tone arm suspension comprising: an upstanding post; an elongated tone arm extending generally laterally from the post; means for supporting a stylus at the extended end portion of the tone arm; bearing means mounted at the other end of the tone arm, said bearing means having a vertical passage therethrough for removably receiving said post whereby said tone arm is adapted to slide vertically and to swing laterally with respect to the axis of the post; a first discoid magnet affixed to said tone arm coaxially with said passage; a second discoid magnet mounted below said first magnet coaxially with the post, said first and second magnets having opposing magnetic fields, the repelling force of said opposing magnetic fields being such as to produce an upward force equal to the down force caused by the weight of the tone arm, and the bottom of the tone arm being thereby floated at an elevation appreciably above the top of the lower magnet; and magnet field modifying means for each of said first and second discoid magnets and arranged to impart a magnetic torque on the tone arm so as to urge it to swing laterally about the axis of the post when said field modifying means are approximately vertically aligned.

8. A tone arm suspension as defined in claim 7 and an adjustable counterweight mounted at said other end portion of the tone arm beyond said bearing means.

9. A tone arm suspension as defined in claim 7 wherein the wall of said passage formed through said bearing means comprises oppositely disposed laterally extending knife edges facing each other in a horizontal plane.

10. A tone arm suspension as defined in claim 7 wherein said bearing means comprises an insulating disc having its top and bottom faces grooved along a zone thereof coinciding with the ends of said passage and running parallel to a line drawn between said one tone arm end portion and said passage, said grooves being oppositely inclined from the outer ends thereof toward the center of said bearing means for converging to a pair of spaced arcuate laterally extending knife edges lying intermediate said faces and in a common horizontal plane and coinciding with opposite wall portions of said passage.

References Cited in the file of this patent

UNITED STATES PATENTS

| | | |
|---|---|---|
| 2,532,293 | De Weese | Dec. 5, 1950 |
| 2,658,805 | Mendelsohn | Nov. 10, 1953 |
| 2,966,360 | Herve | Dec. 27, 1960 |
| 2,993,698 | Stanton | July 25, 1961 |
| 3,005,059 | Raabe | Oct. 17, 1961 |
| 3,029,824 | Goodell | Apr. 17, 1962 |

FOREIGN PATENTS

| | | |
|---|---|---|
| 618,814 | Great Britain | Feb. 28, 1949 |